United States Patent
Wickeraad

(10) Patent No.: US 6,587,893 B1
(45) Date of Patent: Jul. 1, 2003

(54) METHOD AND APPARATUS TO DETERMINE WHEN ALL OUTSTANDING FETCHES ARE COMPLETE

(75) Inventor: John A. Wickeraad, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,168

(22) Filed: Apr. 28, 2000

(51) Int. Cl.7 .......................... G06F 13/14; G06F 13/20
(52) U.S. Cl. ................. 710/5; 710/6; 710/15; 710/18; 710/19; 709/3; 709/8
(58) Field of Search .................. 710/5, 15, 18, 710/19, 6; 709/3, 8

(56) References Cited

U.S. PATENT DOCUMENTS

| | | | |
|---|---|---|---|
| 3,783,255 A | * 1/1974 | Buedel et al. ................ | 714/31 |
| 5,870,758 A | * 2/1999 | Bamford et al. ............ | 707/201 |
| 6,275,876 B1 | * 8/2001 | Valk et al. ..................... | 710/19 |
| 6,353,845 B1 | * 3/2002 | Torzewski et al. .......... | 709/102 |
| 6,434,637 B1 | * 8/2002 | D'Errico ...................... | 710/38 |

* cited by examiner

Primary Examiner—Jeffrey Gaffin
Assistant Examiner—Rehana Perveen

(57) ABSTRACT

A method and apparatus determines completion of all of one or more operations for a particular input/output device initiated prior to an inquiry start time. The method provides one or more in-progress bits and an equal number of snapshot bits. Each in-progress bit corresponds to a respective associated operation for the input/output device. An in-progress bit is set when the associated operation is initiated. The in-progress bit is cleared when the associated operation is completed. The method copies, at the inquiry start time, all of the in-progress bits to the corresponding snapshot bits and clears a snapshot bit when the associated operations is completed. Finally, the method determines whether every one of said one or more snapshot bits is cleared. The apparatus comprises an input/output operator, one or more operation requesters, one or more in-progress bits and an equal number of snapshot bits. Preferably, the in-progress bits are grouped in a register, as are the snapshot bits. Each in-progress bit corresponds to a respective associated operation for the input/output devices, is set when the associated operation is initiated, and is cleared when the associated operations is completed.

13 Claims, 2 Drawing Sheets

METHOD AND APPARATUS TO DETERMINE WHEN ALL OUTSTANDING FETCHES ARE COMPLETE

TECHNICAL FIELD

The invention relates to digital electronic circuitry. More particularly, the invention relates to a method and apparatus to determine when all outstanding fetches, i.e., memory read requests, are complete in a computer input/output system.

BACKGROUND OF THE INVENTION

An input/output ("I/O") system can serve several I/O devices. It may be desirable to replace one of the devices during the operation of the I/O system while not affecting the I/O traffic associated with the other devices, a procedure known as on-line replacement ("OLR"). Also one device may need to be reset due to an error associated with that device, and again it is desirable to not affect the traffic of the devices. An I/O system may have multiple outstanding memory read requests on behalf of the device that requires resetting or replacing. These outstanding memory requests may result in non-coherent data being stored in the I/O system for the device. It is possible that this non-coherent data may be returned to the device after it is replaced or reset. This could result in stale data being given to the device. Before removing the data that is stored in the I/O system for the device it is necessary to know that all outstanding memory requests have been satisfied. In large systems this can theoretically take a long time, even though the majority of the requests are completed quickly. Two examples of why a request may take a long time to complete:

(1) The system is extremely busy; or
(2) Part of the system has failed and the request must wait for a timeout.

It is undesirable to have to wait the maximum time the request would take to complete (either normal completion or a timeout) each time a I/O device needs to be reset or replaced. Examples of times when it is desirable to know that all fetches for a device (or all the devices) have been completed include:

(1) OLR of one or multiple devices;
(2) OLR of I/O system, in which case the system needs to know ALL fetches are complete in order to shut down the I/O system in a systematic way; and
(3) To abort a direct memory access ("DMA") sequence for a device due to some abnormal behavior (or error condition).

Prior solutions to the above problems have mainly been solved in operating system ("OS") software. The OS would shut down the I/O devices that needed to be replaced or reset. Then, in order to make sure all the fetches for those devices were complete, a wait loop would be invoked. This wait loop would need to be as long as the maximum of the timeout for the fetches or theoretical limit of the memory return for the request. This wait loop could take a long time, in certain cases about 100 milliseconds. There are certain error recovery situations in which this time is longer than desirable as the I/O device would be unavailable during the entire wait loop time. In the vast majority of cases, the outstanding memory requests receive the required response relatively quickly, less than 2 microseconds. This means that the loop time is usually about 50,000 times longer than necessary.

SUMMARY OF INVENTION

In one respect, the invention is a method for determining completion of all of one or more operations for a particular input/output device initiated prior to an inquiry start time. The method provides one or more in-progress bits and an equal number of snapshot bits. Each in-progress bit corresponds to a respective associated operation for the input/output device. Each of the one or more in-progress bits is set when the associated operation is initiated. Each of the one or more in-progress bits is cleared when the associated operation is completed. The method copies, at the inquiry start time, all of the in-progress bits to the corresponding snapshot bits and clears a snapshot bit when the associated operations is completed. Finally, the method determines whether every one of said one or more snapshot bits is cleared.

In another respect, the invention is an apparatus for determining completion of all of one or more operations for a particular input/output device initiated prior to an inquiry start time. The apparatus comprises an input/output operator, one or more operation requesters, one or more in-progress bits and an equal number of snapshot bits. Preferably, the in-progress bits are grouped in a register, as are the snapshot bits. Each in-progress bit corresponds to a respective associated operation for the input/output devices, is set when the associated operation is initiated, and is cleared when the associated operations is completed.

In yet another respect, the invention is a computer readable medium on which is embedded a program. The embedded program comprises components that execute the above method or that correspond to the above apparatus components.

In comparison to the prior art, certain embodiments of the invention are capable of dramatically reducing waiting time. As an example, after the OS software has shut down the I/O devices that need to be replaced or reset, software can send the hardware a command indicating that it wants to know when all current outstanding memory fetches are complete. Instead of waiting the maximum time necessary for completion of a software loop, the system software can instead set and read a register that will indicate when memory fetches are complete. System software can loop on this register until all the fetches are complete. This reduces the amount of time that system software will have to wait to less than 2 microseconds in all but a very few cases.

Those skilled in the art will appreciate this and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
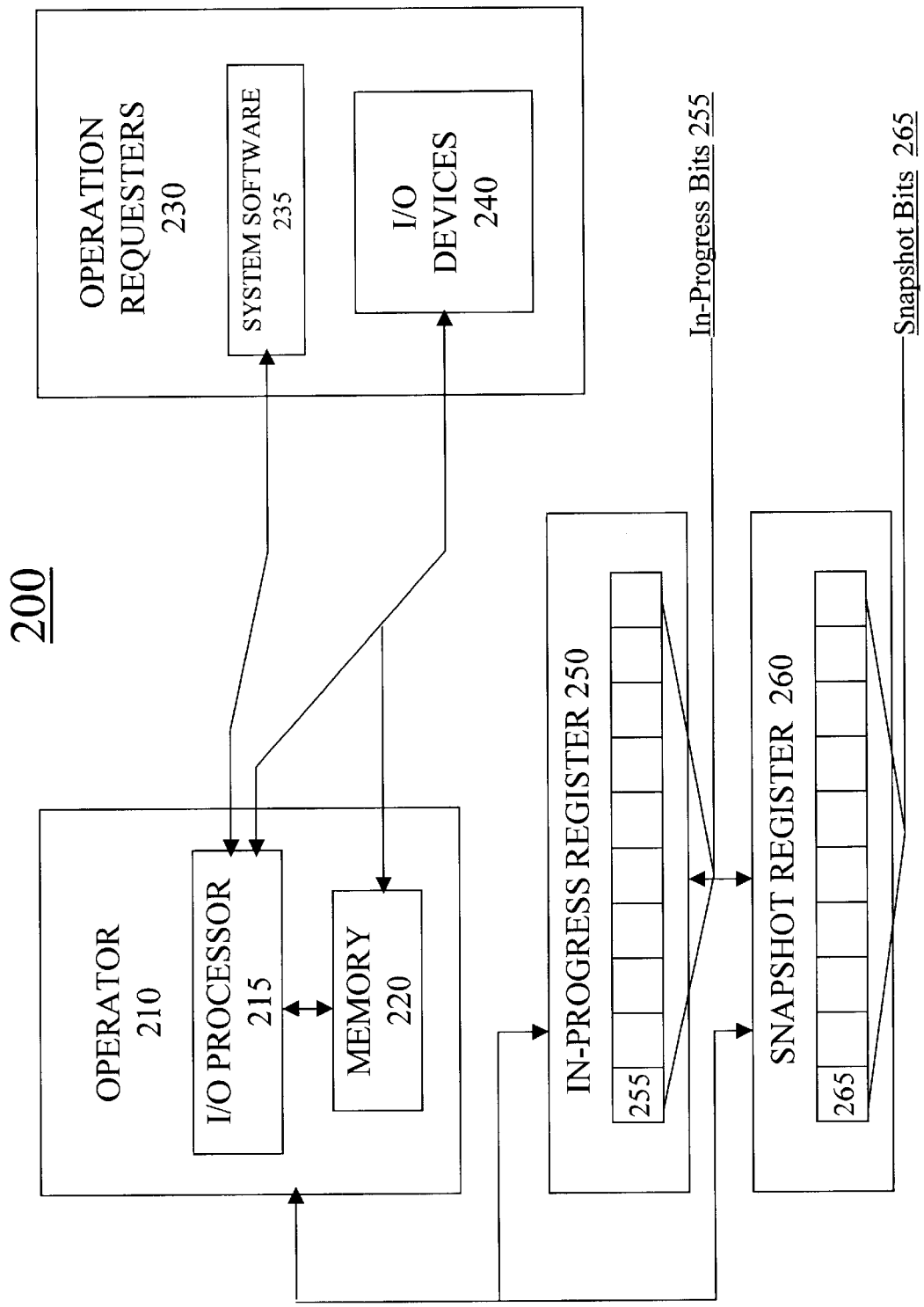
FIG. 1 is a diagram of an apparatus according to one embodiment of the invention.
Figure 2:
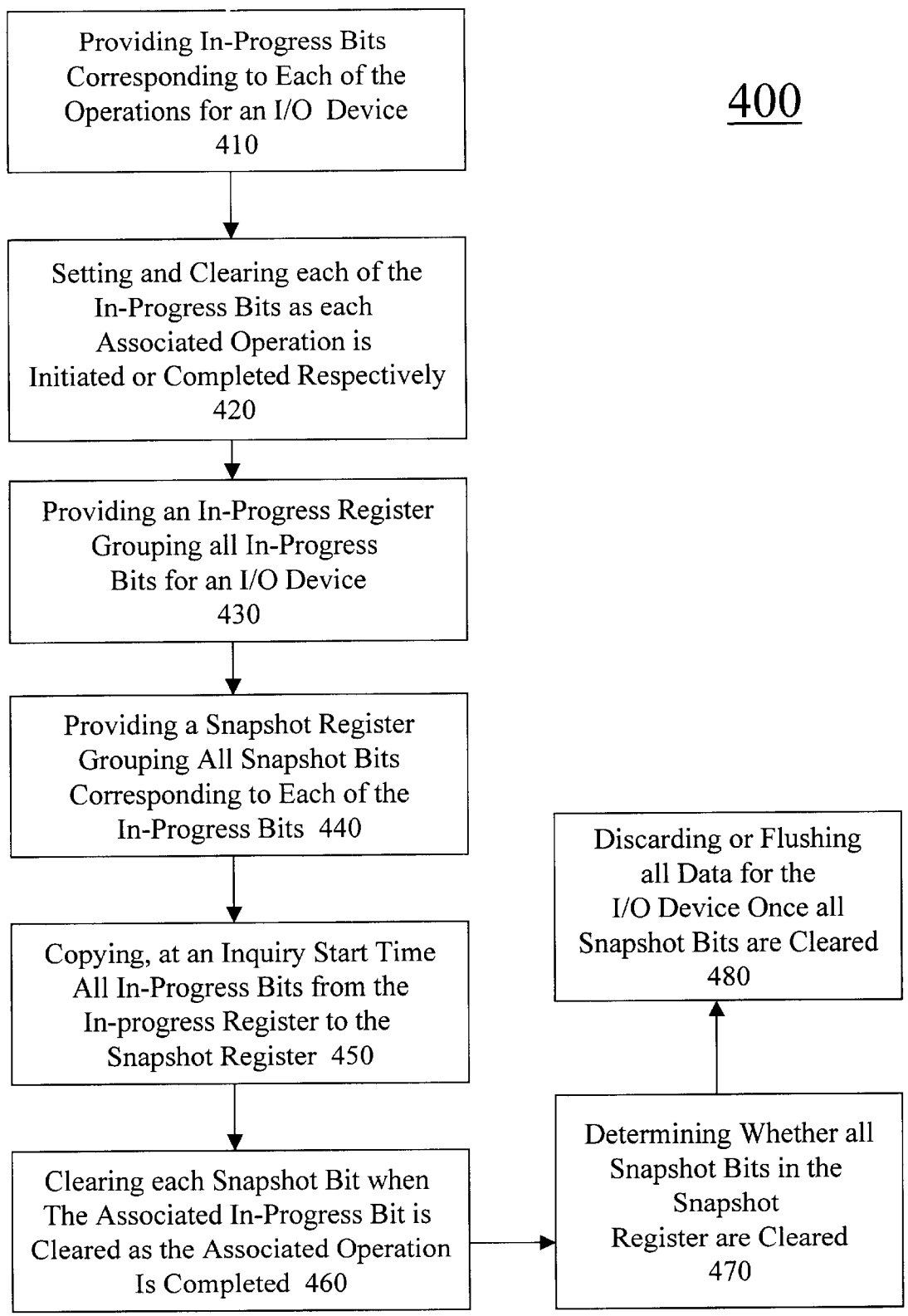
FIG. 2 is a flowchart of a method according to one embodiment of the invention.

FIG. 1 is a diagram showing an apparatus 200 according to one embodiment of the invention. FIG. 2 shows an operator 210, typically consisting of an I/O processor 215 operably connected to I/O memory 220, operably connected to operation requesters 230. Such operation requesters 230 typically include system software 235 and any I/O devices 240 connected to the I/O system. Furthermore, the operator 210 is functionally connected to an in-progress register 250, containing one or more in-progress bits 255, and to a snapshot register 260, containing one or more snapshot bits 265.

The I/O devices 240 send memory read requests to the I/O processor 215 which communicates the memory read requests from I/O devices 240 to the I/O memory 220. Alternatively, the I/O devices 240 may perform Direct Memory Access ("DMA") operations whereby the I/O devices 240 read and write directly to the I/O memory 220. For each memory read request or DMA operation, the I/O processor 210 sets an associated in-progress bit 255 in an in-progress register 250 associated with the I/O device 240 requesting the operation. When the requested operation is completed, the I/O processor 210 clears the associated in-progress bit 255.

Under certain circumstances, such as when an error occurs for a particular I/O device 240, or when an I/O device 240 needs to be replaced or reset, the system software 235 will request that a copy of the current state of the in-progress register 250 associated with the I/O device 240 being replaced, reset or corrected be placed into a snapshot register 260. The snapshot bits 265 in the snapshot register 260 associated with the in-progress register 250 are cleared when the corresponding in-progress bits 255 are cleared, but are not set when the corresponding in-progress bits 255 are set. This enables the I/O processor 210, and thus the system software 230, to determine when all operations outstanding at the time the system software 230 requested a snapshot be made for the particular I/O device 240 have been completed. The I/O processor 210 and system software 230 may then safely clear all data associated with the particular I/O device 240 for which the snapshot copy was requested, and may then reset, replace or reactivate the I/O device 240.

In one particular embodiment of the invention, the memory 220 is a cache memory and there is a single in-progress bit 255 for each cache line that is set each time a memory read request is made. When the memory return comes back to the cache from the memory system, the in-progress bit 255 is cleared for the corresponding cache line. In this embodiment, the requests and responses are tracked by matching them with the cache line. This technique can be applied to other ways of tracking outstanding requests. For example, if Transaction ID's are used, a single bit per ID would be required to track outstanding requests. System software can read all of these in-progress bits 255 to determine if there are any outstanding requests. However, in a busy system there will almost always be outstanding requests. When there is an error with one of the I/O devices 240 below the I/O system, the I/O device 240 can be reset. In order to determine that all outstanding requests are completed for the I/O device 240 being reset, system software requests that a snapshot of the in-progress bits 255 be taken. This will cause all in-progress bits 255 to be copied to a separate register, the snapshot register 260. As the memory returns continue to be received, the normal in-progress bits 255 are cleared as well as the corresponding snapshot bit 265. New read requests then only set the in-progress bit 255, not the corresponding snapshot bit 265. In this manner, system software can continue to read the snapshot bits 265, and when all the snapshot bits 265 are cleared, it is safe to flush from the I/O system all data that has been read on behalf of the I/O device 240. This will eliminate all stale data from the I/O device 240 before bringing the I/O device 240 back on-line.

FIG. 2 is a flowchart illustrating a method 400 according to one embodiment of the invention. The method 400 provides a number of in-progress bits 255 that correspond to each of the operations for a particular I/O device 240 (step 410). Throughout the method 400, each of the in-progress bits 255 for a particular I/O device 240 may be set as each operation is initiated, or cleared as each operation is completed (step 420). Typically, the operations tracked by the in-progress bits 255 of steps 410 and 420 are I/O memory read requests, often referred to as fetches.

The method 400 further provides an in-progress register 250 that groups together all of the in-progress bits 255 associated with each one of the operations associated with each of the I/O devices 240 (step 430). In addition to the in-progress register 250, in step 440, a snapshot register 260 is provided by the method 400 such that the snapshot register 260 groups a number of snapshot bits 265 in equal number corresponding to the in-progress bits 255 found in the in-progress register 250.

At a time, typically signaled by the system software 235, when it is necessary to reset or delete an I/O device 240 from the I/O system, the then-current status of the in-progress bits 255 in the in-progress register 250 are copied into the corresponding snapshot bits 265 in the snapshot register 260 for the particular I/O device 240 (step 450). The I/O system may then continue to set and clear the in-progress bits 255 in the in-progress register 250 as requested by the system while the snapshot register 260 is utilized to track the completion of every one of the operations in progress at the inquiry start time for the particular I/O device 240. Each snapshot bit 265 in the snapshot register 260 is cleared when the corresponding in-progress bit 255 in the associated in-progress register 250 is cleared to signify the completion of the associated operation for the particular I/O device 240 (step 460). When it is determined that every one of the snapshot bits 265 has been cleared (step 470), thus signifying that all outstanding operations associated with the particular I/O device 240 have completed, all data for the particular I/O device 240 may be discarded or flushed (step 480).

The description of the embodiment above mentions a cache. The same solution could apply for a non-cache based I/O system or subsystem (e.g., a Peripheral Component Interconnect ("PCI") Bridge). In the embodiment above, all the data stored and to be returned to the I/O device 240 is non-coherent. It therefore is still necessary to wait for all fetches to complete before flushing or invalidating all stored data that has been read for the I/O device 240. Otherwise stale data would be returned to the I/O system after the flush has occurred resulting in stale data being stored and possibly used to satisfy a future read request from the I/O device 240.

The components of the apparatus 200 can be hardware, software or a hybrid. In software form, the components can be stored or embodied on a computer readable medium in a variety of formats, such as source code, object code or executable code, for example. Computer readable mediums include both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the invention can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims and their equivalents in which all terms are to be understood in their broadest reasonable sense unless otherwise indicated.

What is claimed is:

1. A method for determining completion of all of one or more operations for a particular input/output device initiated prior to an inquiry start time, the method comprising:

providing one or more in-progress bits, each in-progress bit corresponding to a respective associated one of said one or more operations for said input/output device;

setting an in-progress bit when said associated one of said one or more operations is initiated;

clearing the in-progress bit when said associated one or more operations is completed;

providing one or more snapshot bits of equal number to said in-progress bits;

copying, at said inquiry start time, all of the one or more in-progress bits to the corresponding one or more snapshot bits;

clearing each of said one or more snapshot bits when said associated one or more operations is completed; and determining whether every one of said one or more snapshot bits is cleared.

2. The method of claim 1 further comprising:

clearing all data that has been read for said input/output device upon determination that every one of said one or more snapshot bits have been cleared.

3. The method of claim 1 wherein said operations comprise input/output memory requests.

4. The method of claim 1 further comprising:

grouping all of said one or more in-progress bits in a register; and grouping all of said one or more snapshot bits in a register.

5. An apparatus for determining completion of all of one or more operations for a particular input/output device initiated prior to an inquiry start time, the apparatus comprising:

an input/output operator;

one or more operation requesters;

one or more in-progress bits, each in-progress bit corresponding to a respective associated one of said one or more operations for said input/output devices, each of said one or more in-progress bits being set when said associated one of said one or more operations is initiated, and being cleared when said associated one or more operations is completed; and one or more snapshot bits of equal number to said in-progress bits.

6. The apparatus of claim 5 wherein said one or more operations are selected from the group consisting of:

input/output memory requests; and a copy of all the in-progress bits into the snapshot bits.

7. The apparatus of claim 5 wherein the operator comprises an input/output processor and associated memory.

8. The apparatus of claim 5 wherein the one or more operation requesters comprise:

one or more input/output devices; and system software.

9. The apparatus of claim 5 further comprising:

an in-progress register grouping all of said one or more in-progress bits; and a snapshot register grouping all of said one or more snapshot bits.

10. A computer readable medium on which is embedded a program, the program comprising components that execute a method for determining completion of all of one or more operations for a particular input/output device initiated prior to an inquiry start time, the method comprising:

providing one or more in-progress bits, each in-progress bit corresponding to a respective associated one of said one or more operations for said input/output device, each of said one or more in-progress bits being set when said associated one of said one or more operations is initiated, and being cleared when said associated one or more operations is completed;

providing one or more snapshot bits of equal number to said in-progress bits;

copying, at said inquiry start time, all of the one or more in-progress bits to the corresponding one or more snapshot bits;

clearing each of said one or more snapshot bits when said associated one or more operations is completed; and determining whether every one of said one or more snapshot bits is cleared.

11. The computer readable medium of claim 10 wherein the method further comprises:

clearing all data that has been read for said input/output device upon determination that every one of said one or more snapshot bits.

12. The computer readable medium of claim 10 wherein said operations comprises input/output memory requests.

13. The computer readable medium of claim 10 wherein the method further comprises:

grouping all of said one or more in-progress bits in a register; and grouping all of said one or more snapshot bits in a register.

* * * * *